Patented July 22, 1952

2,604,467

UNITED STATES PATENT OFFICE 2,604,467

COAGULATION OF SYNTHETIC LATICES AND RECOVERY OF EMULSIFYING AGENTS THEREFROM

Willie W. Crouch and Lesher A. Mitchell, Bartlesville, Okla., assignors to Phillips Petroleum Company, a corporation of Delaware No Drawing. Application June 23, 1949, Serial No. 100,976

11 Claims. (Cl. 260—85.1)

This invention relates to the production and treatment of synthetic aqueous latices of polymeric materials, such as latices of synthetic rubber and of synthetic nonelastic resins. In one embodiment this invention relates to coagulation of such a latex and recovery of such a polymeric product, free from the emulsifying agent used in producing the latex. In another embodiment this invention relates to the recovery of an emulsifying agent from an aqueous solution thereof, such as the aqueous medium of a synthetic latex of a polymeric material.

In emulsion polymerization to form high molecular weight polymers, especially synthetic elastomers and resins, the usual practice has been to employ fatty acid soaps as emulsifying agents. After the polymerization reaction has been arrested the polymer is usually coagulated by converting the soap to fatty acid. The fatty acid, being insoluble, is left largely in the polymer, and its presence is frequently deleterious in amounts over two or three per cent. With a view toward producing a polymeric material containing no fatty acid, we have investigated the use of water-soluble salts of selected hydrocarbon sulfonic and sulfuric acids as emulsifying agents in polymerizations, which are anionic surface active, or emulsifying, agents. Certain of these materials have been found to have important advantages over fatty acid soaps. For instance, when using such a material as emulsifying agent in certain synthetic rubber polymerization recipes it has been possible to produce latices of much higher concentration than previously; and in the field of low temperature polymerization selected hydrocarbon sulfonates will produce fluid latices while fatty acid or rosin soaps tend to solidify or gel.

However, dispersions or latices produced by emulsion polymerization using these emulsifying agents are extremely stable and difficult to coagulate. The usual methods of coagulating with brine and/or mineral acids when employing fatty acid soaps frequently fail to coagulate satisfactorily latices or dispersions containing these selected hydrocarbon sulfates or sulfonates. The common laboratory procedure of coagulating by addition of brine and alcohol is more successful, but such a procedure is too expensive for commercial application. Moreover, it has been found undesirable for many applications to leave this type of emulsifier in the coagulated polymer.

Many of the available high molecular weight organic anionic surface active agents are employed industrially in rather large quantities, and their consumption represents an appreciable part of the cost of many products and services. It is therefore desirable to recover these materials after use as detergents, wetting agents, emulsifying agents, etc., when possible to do so economically. Since these surface active agents are usually employed in dilute water solutions, their recovery after use from such dilute solutions by treatment involving evaporation of all the water would, of course, be impractical and uneconomical, and would also involve the inclusion, in the final product, of accompanying impurities. A fatty acid soap may be more simply recovered from dilute solution by treatment involving acidification of the solution to produce the corresponding fatty acid, which, being insoluble, may be then conveniently separated from the bulk of the water.

This method is not applicable, however, to the anionic surface active agents with which our invention is concerned. An important embodiment of invention involves the recovery of those surface active agents which are the water-soluble salts of high molecular weight organic acids which themselves have appreciable solubility in water. Obviously, then, the recovery method applicable to fatty acid soaps involving acidification of their solutions cannot be employed for recovery of such materials as, for example, the higher molecular weight alkyl sulfates, alkaryl sulfonates, and the like.

We have now found a novel and efficient process for the treatment of a dispersion or latex produced by the emulsion polymerization of monomers and employing a selected hydrocarbon sulfate or sulfonate as the emulsifying agent. This embodiment of our invention comprises coagulation of the latex followed by removal of the emulsifying agent and includes the following series of steps: (a) coagulation by the addition of a water-soluble aluminum salt which reacts with the emulsifying agent to form an insoluble aluminum hydrocarbon sulfate or sulfonate, (b) addition of potassium or sodium hydroxide, or other alkaline reagent, to adjust the pH to a value above 9, preferably between 9.4 and 12 and (c) filtering and washing the coagulum to obtain a polymer substantially free of hydrocarbon sulfonates or sulfates and aluminum.

We have also discovered a novel and efficient process for the recovery of such surface active agents from their dilute solutions. One method of practicing this embodiment of our invention comprises the following series of steps: precipitation of a water-insoluble aluminum salt of the surface active agent; removal of this aluminum precipitate from the water by suitable means; dissolving the said precipitate in an alcohol, or an aqueous solution thereof; adding aqueous, or alcoholic, alkali metal hydroxide solution, or aqueous ammonia solution, whereupon an inorganic aluminum precipitate is formed, leaving the surface active agent dissolved; separation of said precipitate from the solution of the surface active material and; evaporation of solvent alcohol and water to recover the surface active agent as its alkali metal or ammonium salt. When the emulsifying agent is to be used in a polymerization recipe in which the alcohol can also be present, this last step may be omitted or modified, and a resulting alcoholic solution of the emulsifying agent can be added directly to the polymerization system.

An object of our invention is to coagulate a latex of a synthetic polymeric material, prepared by polymerization while dispersed in an aqueous medium, and to recover the emulsifying agent from the latex separately from the polymer.

Another object of our invention is to recover a polymeric material from a dispersion in an aqueous medium.

A further object of our invention is to recover an anionic surface active agent from an aqueous solution.

Further objects and advantages of our invention will become apparent, to one skilled in the art, from the accompanying disclosure and discussion.

When the practice of the invention involves a coagulation of a polymer latex, an aluminum salt is added and effects both a precipitation of the emulsifying agent and a coagulation of the polymer. In order to recover an emulsifier-free polymer the mixture is made alkaline, to a pH where the precipitated aluminum salt of the emulsifying agent is dissolved. Presumably this involves conversion of the aluminum to an aluminate. The coagulated polymer can then be separated and washed free from both aluminum and emulsifying agent, and both these constituents remain, for the most part, in solution in the resulting serum. Reprecipitation of the water-insoluble aluminum salt is then accomplished by acidifying the solution. When the emulsifying agent to be recovered is in some solution and no coagulation of a suspended or dispersed material is effected, the precipitation usually involves only adding an aluminum salt to the solution, and the resolution and reprecipitation are not included. In either modification, we have found that the amount of water-soluble aluminum salt added to the dilute solution in the first step should usually lie in the range from about 80 to about 250 per cent of the stoichiometric requirement for formation of the water-insoluble aluminum salt of the surface active agent present. Aluminum salts applicable in the process of the invention comprise water-soluble salts such as aluminum chloride, aluminum nitrate and aluminum sulfate; the last-named material is a preferred salt. Double aluminum salts included in the class of compounds known as alums are also satisfactory. The alums are of the general type, $MAl(SO_4)_2 \cdot 12H_2O$, where M represents sodium, potassium, ammonium, or thallium. Other double aluminum salts which ionize to yield aluminum ions, such as sodium aluminum chloride, can also be employed, if desired.

We have also found it usually to be essential that, for the successful precipitation of the water-insoluble aluminum salts of the surface active materials with which we were concerned, the pH of the water solution, after addition of the water-soluble aluminum salt, should be in the range from 1.5 to 4. Therefore, when recovering surface active agents from highly alkaline, acidic or buffered solutions, it is often desirable and sometimes necessary to effect initial adjustment of the pH by addition of the necessary amount of a mineral acid or alkali metal hydroxide prior to the addition of the water-soluble aluminum salt.

When treating a serum solution, resulting from treating a latex, according to the present invention, no further water-soluble aluminum salt is added, but a mineral acid is added to bring the pH down to a value in the range 1.5 to 4, whereupon the emulsifying agent is precipitated, as the aluminum salt. The succeeding steps of the invention are then effected as previously outlined.

The lower molecular weight alcohols are usually preferred in our invention, and we usually prefer to use an aliphatic alcohol containing from one to four carbon atoms to the molecule. The concentration of the aluminum salt of the surface active material in the alcoholic solution can lie in the range from three to 40 weight per cent. The amount of water which may be present in the alcohol lies in the range from zero to 70 weight per cent of the total soltuion. The maximum amount of water which can be tolerated depends largely on the specific alcohol employed, e. g., more water can be tolerated when using isopropanol than when using methanol because the aluminum salts of the specified surface active agents are more soluble in isopropanol-water solutions than in methanol-water solutions of the same concentration. Too much water may cause insolubilization of the aluminum salt of the surface active agent with concomitant loss during the filtration. The amount of alkali metal hydroxide or ammonium hydroxide solution which may be added in this step of our process lies in the range from 100 to 150 per cent of the amount required stoichiometrically for the conversion of all the aluminum present to aluminum hydroxide. It has been found that when excess base is used, even as much as the stoichiometric requirement for formation of the corresponding aluminate, the aluminum still precipitates from the alcohol or alcohol-water solution. This is in contrast to the fact that alkali metal aluminates are soluble in water. It is not known whether the precipitate formed in this step is aluminum hydroxide or an aluminate or a mixture of both, although it is felt that it is probably aluminum hydroxide.

In a specific embodiment of our invention a 3.3 weight per cent aqueous solution of a sodium alkylbenzene sulfonate is treated with an aqueous solution of aluminum sulfate. A precipitate is formed, and is recovered by filtration. This precipitate is then dissolved in methanol and treated with sodium hydroxide solution to precipitate the aluminum in the form of an inorganic compound, presumably aluminum hydroxide, insoluble in the methanol-water solution. The solution is then freed of the solids by filtration and evaporated to leave the dry sodium alkylbenzene sulfonate in a recovery of about 90 per cent.

The process of our invention is applicable to an aqueous solution containing any anionic surface active agent which is soluble in acid solution, but whose aluminum salts are insoluble in water or acid solution. Examples of such materials include the alkali metal or ammonium salts of aliphatic substituted benzene or naphthalene sulfonic acids wherein the aliphatic portion of the compound contains from three to twenty carbon atoms, and the alkali metal or ammonium salts of aliphatic sulfuric or aliphatic sulfonic acids containing from six to twenty carbon atoms. Other emulsifying agents applicable include sulfates of polyalkylene glycol ethers such as 1. 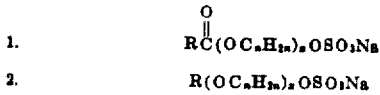

2. 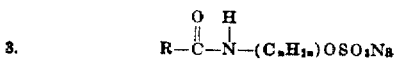

and sulfated long-chain hydroxyamides, such as

3. $R-\overset{O}{\overset{\|}{C}}-\overset{H}{\overset{|}{N}}-(C_nH_{2n})OSO_3Na$ where, in each case, R is an alkyl or alkaryl hydrocarbon radical, and preferably contains from 12 to 18 carbon atoms; in some instances R can contain as many as 8 to 20 carbon atoms. In these formulas $n$ is an integer between 2 and 4, inclusive, and $x$ is an integer between 4 and 12, inclusive.

In practicing those embodiments of the invention which comprise coagulation of a polymer latex, they can be applied to latices of any kind of a polymer, so long as the emulsifying agent used in the latex is of the type, or class, hereinbefore discussed. Such polymers include synthetic rubber, such as made by polymerizing monomeric material comprising an unsaturated organic compound containing a $CH_2=C<$ group, alone or together with another compound containing such a group, a resin, such as a polystyrene, a polyacrylate, a polyacrylonitrile, and the like, or such as a heteropolymer of sulfur dioxide and an unsaturated organic compound. Such polymers, the large classes of monomers and comonomers from which they can be prepared, and various methods of producing the polymers from an aqueous dispersion or emulsion, are well known to those skilled in the art. Many of these emulsion polymerizations are carried out in an alkaline aqueous medium, and many are carried out in an acidic aqueous medium. The emulsifying agents discussed herein are effective both in acid and alkaline media, and methods have been discussed for adapting the invention to each of such situations. Some of these polymers are produced at low temperatures, including temperatures below the freezing point of water, and a material such as an alcohol is often employed in such recipes; however, there is usually sufficient water present to insure that the aluminum salt will be insoluble, and if the alcohol concentration is too high for this the solution can be diluted with sufficient water to achieve this condition. The treatment steps of our invention are usually carried out at, or near ambient temperatures, usually in the range between about 60 and about 110° F.

Advantages of this invention are illustrated by the following examples. The reactants, and their proportions, and the other specific ingredients of the recipes are presented as being typical and should not be construed to limit the invention unduly.

*Example I*

Butadiene and styrene were polymerized in an emulsion polymerization system employing the following recipe:

| | Parts by weight |
|---|---|
| 1,3-butadiene | 70 |
| Styrene | 30 |
| Mixed tertiary alkyl $C_{12}$–$C_{16}$ mercaptans | 0.28 |
| Cumene hydroperoxide | 0.13 |
| Emulsifier | 5 |
| Water | 180 |
| $Na_3PO_4.12H_2O$ | 0.5 |
| $Na_4P_2O_7.10H_2O$ | 1 |
| Dextrose | 3 |
| $FeCl_3.6H_2O$ | 0.098 |

The polymerization temperature was 41° F. The emulsifier was a mixture of sodium monoalkyltoluene sulfonates having an average molecular weight of 345. The polymerization was shortstopped by addition of 0.2 part di-tertiary butyl hydroquinone at the end of 16.5 hours when the reaction had reached 55 per cent conversion.

To 41 volumes of the latex from this polymerization were added 10 volumes of a 2.5 weight per cent aqueous solution of aluminum sulfate. The polymer coagulated in the form of a fine crumb. Aqueous sodium hydroxide solution was added to the polymer slurry to adjust the pH to a value of 11.1. A portion of the slurry was stirred for a period of 10 minutes, filtered, and the filter cake washed. The polymer was then dried. By extraction with the azeotropic mixture of ethanol and toluene, the polymer was found to contain substantially no alkyltoluene sulfonate. A yield of 59 per cent of the alkyltoluene sulfonate was obtained. When another portion of the slurry was stirred for eight hours, and similarly treated, 86 per cent of the alkyltoluene sulfonate which was present in the latex sample was recovered from the filtrate. Analysis also showed that substantially no aluminum was present in the dried polymer sample.

*Example II*

Another 41 volumes of the latex described in Example I was treated in the same manner as in Example I except that only enough sodium hydroxide was added to raise the pH to a value of 9.4. Extraction of the dried polymer with the azeotropic mixture of ethanol and toluene showed that the polymer contained substantially no alkyltoluene sulfonate.

Another sample of the latex described in Example I was coagulated in the same manner as in that example, filtered and dried without further treatment. Analysis of this sample showed that more than sixty per cent of the aluminum alkyltoluene sulfonate was left in the polymer.

*Example III*

Butadiene and styrene were polymerized in an emulsion polymerization system employing the following recipe:

| | Parts by weight |
|---|---|
| 1,3-butadiene | 70 |
| Styrene | 30 |
| Water | 180 |
| Emulsifier | 5 |
| Cumene hydroperoxide | 0.395 |
| Mixed tertiary mercaptans | 0.25 |
| Ferrous sulfate heptahydrate | 0.60 |
| Potassium pyrophosphate, anhydrous | 0.525 |

The emulsifier was a mixture of sodium monoalkyltoluene sulfonates having an average molecular weight of 345. The polymerization temperature was 41° F. The reaction was shortstopped by addition of 0.2 part di-tertiary butyl hydroquinone at the end of 16 hours when the polymerization had reached 88.1 per cent conversion.

Fifty volumes of the latex was diluted with an equal volume of water. With vigorous agitation being employed, five volumes of a 2.5 per cent solution of aluminum sulfate was added. The polymer coagulated in the form of a fine crumb. To the polymer slurry was added 0.35 volumes of 20 percent sodium hydroxide solution. The polymer slurry was stirred for 10 minutes and the pH then determined to be 9.5. The slurry was then filtered, washed and dried. Analysis showed that substantially no alkyltoluene sulfonate was left in the polymer.

*Example IV*

A polymerization was effected in emulsion employing 72 parts by weight 1,3-butadiene, 28 parts styrene, 180 parts water, 4.7 parts sodium alkylbenzene sulfonate emulsifier, prepared by desalting and deoiling a commercial product known as Santomerse No. 1, and suitable catalysts and modifiers. The polymerization was stopped at 63 per cent conversion after reacting 13 hours at 41° F. The unreacted butadiene was vented from the latex and the unreacted styrene was steam distilled from the latex. The resultant latex contained 24 weight per cent solids.

To 48 volumes of the latex were added 12 volumes of a five weight per cent aqueous solution of aluminum sulfate octadecahydrate and 50 volumes of water. Coagulation of the rubber latex occurred with fine crumb being formed. Then 1.2 volumes of a 16.6 weight per cent aqueous sodium hydroxide solution was added, enough to raise the pH to 10.5. The polymer was removed from the solution by filtration and was washed with 100 volumes of water. It was substantially free from aluminum and from components of the emulsifying agent. The filtrate and water washings, containing dissolved sodium aluminate and dissolved sodium alkylbenzene sulfonate, were combined, and 2 volumes of 10 weight per cent aqueous sulfuric acid was added. The aluminum alkylbenzene sulfonate precipitated and was recovered from the solution by filtration. The filter cake was placed in 200 volumes of methanol and stirred for 30 minutes, whereupon the aluminum alkylbenzene sulfonate dissolved. A small amount of undissolved polymer was filtered from the solution. Then 0.5 volume of 2.7 weight per cent aqueous sodium hydroxide solution and 60 volumes of water were added. A white precipitate appeared, presumably aluminum hydroxide, and it was filtered from the solution. The filtrate was evaporated to dryness and 0.43 part by weight of dry sodium alkylbenzene sulfonate remained, representing a recovery of about 50 per cent of the sulfonate in the sample treated.

*Example V*

To 297 volumes of an aqueous solution containing 10 parts by weight of mixed sodium alkyltoluene sulfonates (about 3 weight per cent), in which the alkyl groups contained 11 to 14, inclusive, carbon atoms, was added 61.7 volumes of a five weight per cent aqueous solution of aluminum sulfate octadecahydrate. A precipitate of aluminum alkylbenzene sulfonate formed and was recovered by filtration and washed with a small portion of water. It was then dissolved in 95 volumes of methanol. To this solution was added 5.55 volumes of a 16.6 weight per cent aqueous solution of sodium hydroxide, while the solution was being stirred. A fine white precipitate of aluminum hydroxide appeared, and stirring was continued for one-half hour. The precipitate was then removed from the solution by filtration, and the filtrate, comprising a solution of sodium alkylbenzene sulfonate, was evaporated to dryness. Recovery of the sodium alkylbenzene sulfonate was 81.7 per cent. The sulfonate dissolved readily in water and this solution evidenced the wetting and emulsifying action characteristic of the original surface active agent.

*Example VI*

The procedure of Example V was repeated exactly with the exception that only 48.5 volumes of methanol was employed to dissolve the precipitated and filtered aluminum alkylbenzene sulfonate. Recovery was 83.3 per cent.

*Example VII*

The procedure of Example V was again repeated except that 230 volumes of methanol was employed to dissolve the precipitated and filtered aluminum alkylbenzene sulfonate. Recovery was 86.4 per cent.

*Example VIII*

The procedure of Example V was repeated exactly except that the sodium hydroxide added to the methanol solution of alkylbenzene sulfonate was added as 14.8 volumes of a 10 weight per cent solution of sodium hydroxide in methanol rather than as a water solution. Recovery of the sodium alkylbenzene sulfonate was 89.4 per cent.

*Example IX*

To 302 volumes of an aqueous solution, containing 10 parts by weight of the same mixed sodium alkyltoluene sulfonates used in Example V (about 3 weight per cent), was added 61.7 volumes of a five weight per cent solution of aluminum sulfate octadecahydrate. The precipitate which formed was filtered and washed on the filter with a small volume of water. It was then dissolved in 95 volumes of methanol. To this solution was added 7.4 volumes of a 16.6 weight per cent sodium hydroxide solution instead of the 5.55 volumes employed in Example I. A fine precipitate appeared and was filtered from the solution. The filter cake was washed with small portions of methanol and these were combined with the filtrate. The filtrate was heated and the methanol and water evaporated to obtain the dry sodium alkylbenzene sulfonate with a recovery of 88.7 per cent.

*Example X*

The procedure of Example V was repeated exactly with the exception that 22.5 volumes of a 5 weight per cent sodium hydroxide solution was employed instead of the 16.6 weight per cent solution employed in Example V. Recovery of the sulfonate was 82.5 per cent.

*Example XI*

The procedure of Example V was repeated except that the surface active agent was sodium di-sec.-butyl naphthalene sulfonate. Recovery of the sulfonate was 78.2 per cent.

*Example XII*

To 300 volumes of an aqueous solution containing 10 grams of sodium lauryl sulfate was added 77.2 volumes of a five weight per cent solution of aluminum sulfate octadecahydrate. A precipitate formed and was recovered by filtration, and washed with a small portion of water. It was then dissolved in 95 volumes of methanol. To this solution was added 6.95 volumes of a 16.6 weight per cent aqueous solution of sodium hydroxide while the solution was being stirred. A fine white precipitate appeared, and stirring was continued for one-half hour. The precipitate was then removed from the solution by filtration, and the filtrate was evaporated to dryness. Recovery of the sulfate was 82.9 per cent.

*Example XIII*

To 300 volumes of an aqueous solution containing 10 grams of a potassium dodecyl benzene sulfonate was added 59 volumes of a five weight per cent solution of aluminum sulfate octadecahydrate. A white precipitate formed and was recovered by filtration and washed with a small amount of water. It was then dissolved in 95 volumes of methanol. To this solution was added 7.45 volumes of a 16.6 weight per cent aqueous solution of potassium hydroxide while the solution was being stirred. A fine white precipitate formed, and stirring was continued for one-half hour. The precipitate was then removed from the solution by filtration, and the filtrate was evaporated to dryness. Recovery of the potassium alkylbenzene sulfonate was 90 per cent.

*Example XIV*

To 300 volumes of an aqueous solution containing 10 grams of mixed sodium alkyltoluene sulfonates, containing 11 to 14 inclusive, carbon atoms in the alkyl group, was added 62 volumes of a five weight per cent solution of aluminum sulfate octaldecahydrate. A precipitate formed and was recovered by filtration and washed with a small amount of water. It was then dissolved in 100 volumes of methanol. To this solution was added 2 volumes of ammonia water containing 28 per cent ammonia, together with 2 volumes of water, while the solution was being stirred. A white precipitate formed, and stirring was continued for one-half hour. The precipitate was then removed from the solution by filtration, and the filtrate was evaporated to dryness. Recovery of ammonium alkylbenzene sulfonate was 78 per cent of the original sulfonate present in the dilute solution.

*Example XV*

To 30 volumes of an aqueous solution containing 10 parts by weight of mixed sodium alkyltoluene sulfonates, containing 11 to 14, inclusive, carbon atoms in the alkyl group, was added 62 volumes of a five weight per cent aqueous solution of aluminum sulfate octadecahydrate. A fine precipitate formed and was recovered by filtration and washed with a small portion of water. The precipitate was dissolved in a mixture of 61 volumes of isoproponal and 48 volumes of water. To this solution was added 5.6 volumes of a 14 weight per cent sodium hydroxide solution and 50 volumes of water while the solution was being stirred. A white precipitate appeared, and stirring was continued for a short time. The precipitate was then removed from the solution by filtration, and the filtrate was evaporated to dryness. Recovery of the sodium alkylbenzene sulfonate was 87.9 per cent.

*Example XVI*

The copolymerization of butadiene with styrene was effected at 41° F. using the following recipe:

|  | Parts by weight |
|---|---|
| Butadiene | 70 |
| Styrene | 30 |
| Water | 180 |
| Sodium alkyltoluene sulfonate [1] | 5.0 |
| Trisodium phosphate, $Na_3PO_4.12H_2O$ | 0.2 |
| Sodium hydroxide | 0.04 |
| Dextrose | 1.0 |
| Ferrous sulfate, $FeSO_4.7H_2O$ | 0.28 |
| Potassium pyrophosphate, $K_4P_2O_7$ | 0.354 |
| Cumene hydroperoxide, 100% | 0.20 |
| Mercaptan blend [2] | 0.22 |

[1] Same as in Example I.
[2] A blend of tertiary $C_{12}$, $C_{14}$, and $C_{16}$ aliphatic mercaptans in a ratio of 3 : 1 : 1 parts by weight.

Polymerization was carried out in the conventional manner. A conversion of 60 per cent was reached in 9 hours.

The latex prepared according to the above described procedure was divided into two portions and a different coagulation procedure followed for each portion. In the first instance aluminum sulfate alone was employed as the coagulant while in the second case aluminum sulfate followed by treatment with sodium hydroxide was employed.

Each sample was compounded according to the following recipe:

|  | Parts by weight |
|---|---|
| Polymer | 100 |
| Carbon black | 50 |
| Zinc oxide | 3 |
| Asphalt softener | 6 |
| Stearic acid | 2 |
| Sulfur | 1.75 |
| N-cyclohexyl-2-benzothiazolesulfenamide | 0.8 |

Curing was effected at 307° F. Tests were made on the samples at equal states of cure as determined by compression set data. The results are herewith presented:

|  | Method of Coagulation | |
|---|---|---|
|  | $Al_2(SO_4)_3$ | $Al_2(SO_4)_3$–NaOH |
| Minutes cure at 307° F | 45 | 36 |
| Unaged Samples— |  |  |
| Stress-strain properties at 80° F.: |  |  |
| 300% modulus, p. s. i | 830 | 1,380 |
| Tensile, p. s. i | 2,620 | 3,490 |
| Stress-strain properties at 200° F.: |  |  |
| Tensile, p. s. i | 1,330 | 1,980 |
| Hysteresis, ΔT °F | 134.4 | 85.8 |
| Resilience, percent | 51.8 | 59.0 |
| Abrasion loss, grams (35 min. cure) | 5.50 | 3.68 |
| Oven Aged 24 Hours at 212° F.— |  |  |
| Stress-strain properties at 80° F.: |  |  |
| 300% modulus, p. s. i | 1,735 | 2,765 |
| Tensile, p. s. i | 2,835 | 3,395 |
| Hysteresis, ΔT °F | 113.1 | 68.2 |
| Resilience, per cent | 55.9 | 64.3 |

A sample of the polymer obtained from each method of coagulation was extracted with ethanol-toluene azeotrope (referred to as ETA). Results of these tests show that when aluminum sulfate alone is used as the coagulant, a high percentage of the sulfonate remains in the polymer. The presence of high concentrations of the sulfonate produces deleterious effects on certain physical properties of the polymer as shown in the above recorded results. The ETA extract values obtained and also the ash content of the polymers were as follows:

| Method of Coagulation | ETA, Per Cent | Ash, Per Cent |
|---|---|---|
| Aluminum sulfate | 9.4 | 1.30 |
| Aluminum sulfate-NaOH | 5.4 | 0.91 |

As will be evident to those skilled in the art, various modifications of this invention can be made, or followed in the light of the foregoing disclosure and discussion, without departing from the spirit or scope of the disclosure or from the scope of the claims.

We claim:

1. In a process for recovering and separating from a synthetic rubber type coagulated copolymer an emulsifying agent of the class consisting of organic sulfate and organic sulfonate, the said emulsifying agent having been employed to establish the aqueous emulsion in which the said coagulated copolymer has been produced from a 1,3-diolefin and an unsaturated organic monomer containing a terminal CH₂=< group and copolymerizable therewith and wherein concomitantly the said coagulated copolymer is recovered free from said emulsifying agent the steps which comprise adding to a latex containing copolymer, which upon coagulation of the latex will result in said synthetic rubber type coagulated copolymer, a water-soluble aluminum salt in an amount between 80 and 250 per cent of the stoichiometric requirement for formation of a water-insoluble aluminum salt of said emulsifying agent, thereby effecting a coagulation of said latex, admixing with said coagulated latex an alkaline reagent in an amount sufficient to produce a solution having a pH between 9 and 12, removing resulting emulsifier-free coagulated polymer from a resulting aqueous solution, adding a water-soluble acid to said solution in an amount to produce a solution having a pH between 1.5 and 4, thereby effecting a precipitation of an aluminum salt of said emulsifying agent, separating said precipitate, dissolving said precipitate in an aliphatic alcohol having not more than four carbon atoms per molecule, adding to said alcoholic solution an alkaline reagent in an amount between 100 and 150 per cent of the amount required stoichiometrically to convert the aluminum present to aluminum hydroxide, removing a resulting aluminum-containing precipitate, removing the solvent from a resulting solution, and recovering as a product of the process an emulsifying agent of said class.

2. In a process for copolymerizing a mixture comprising a 1,3-diolefin and an unsaturated organic monomer containing a terminal CH₂=C< group and copolymerizable therewith in aqueous emulsion to produce a synthetic rubber, in the presence of an emulsifying agent of the class consisting of organic sulfate and organic sulfonate emulsifying agents, the improvement which comprises recovering said polymer free from said emulsifying agent by adding to a resulting latex a water-soluble aluminum salt in an amount between 80 and 250 per cent of the stoichiometric requirement for formation of a water-insoluble aluminum salt of said emulsifying agent, thereby effecting a coagulation of said latex, admixing with said coagulated latex an alkaline reagent in an amount sufficient to produce a solution having a pH between 9 and 12, removing resulting coagulated polymer from a resulting aqueous solution, washing said polymer with water, and recovering as a product of the process a resulting synthetic rubber polymer free from said emulsifying agent and from derivatives thereof.

3. In a process for recovering and separating from a synthetic rubber type coagulated copolymer an emulsifying agent of the class consisting of organic sulfate and organic sulfonate, the said emulsifying agent having been employed to establish the aqueous emulsion in which the said coagulated copolymer has been produced from an unsaturated organic material and wherein concomitantly the said coagulated copolymer is recovered free from said emulsifying agent the steps which comprise adding to a latex containing copolymer, which upon coagulation of the latex will result in said synthetic rubber type coagulated copolymer, a water-soluble aluminum salt in an amount between 80 and 250 per cent of the stoichiometric requirement for formation of a water-insoluble aluminum salt of said emulsifying agent, thereby effecting a coagulation of said latex, admixing with said coagulated latex an alkaline reagent in an amount sufficient to produce a solution having a pH between 9 and 12, removing resulting emulsifier-free coagulated polymer from a resulting aqueous solution, adding a water-soluble acid to said solution in an amount to produce a solution having a pH between 1.5 and 4, thereby effecting a precipitation of an aluminum salt of said emulsifying agent, separating said precipitate, dissolving said precipitate in an aliphatic alcohol having not more than four carbon atoms per molecule, adding to said alcoholic solution an alkaline reagent in an amount between 100 and 150 per cent of the amount required stoichiometrically to convert the aluminum present to aluminum hydroxide, removing a resulting aluminum-containing precipitate, removing the solvent from a resulting solution, and recovering as a product of the process an emulsifying agent of said class.

4. The process of claim 3 in which said emulsifying agent is an alkylbenzene sulfonate of an alkali metal containing from three to twenty carbon atoms in said alkyl part.

5. The process of claim 3 in which said copolymer is a copolymerization product of a monomeric material comprising a major amount of 1,3-butadiene and a minor amount of styrene to produce synthetic rubber and said emulsifying agent in a sodium salt of an alkyl toluene sulfonic acid having an average molecular weight of 345.

6. The process of claim 3 in which said emulsifying agent is sodium lauryl sulfate.

7. The process of claim 3 in which said emulsifying agent is a sulfate of a polyethylene glycol ether containing from 20 to 66 carbon atoms per molecule.

8. A process for recovering an emulsifying agent of the class consisting of organic sulfate and organic sulfonate emulsifying agents from an aqueous solution thereof, which comprises precipitating from said solution a water-insoluble aluminum salt of said emulsifying agent, dissolving said precipitate in an aliphatic alcohol having not more than four carbon atoms per molecule, admixing with said alcoholic solution an alkaline reagent in an amount between 100 and 150 per cent of the amount required stoichiometrically to convert the aluminum present to aluminum hydroxide, removing a resulting aluminum-containing precipitate, and recovering from said alcoholic solution from which all of the aluminum hydroxide has been eliminated an emulsifying agent of said class completely freed of aluminum as a product of the process.

9. A process for recovering an emulsifying agent of the class consisting of organic sulfate and organic sulfonate emulsifying agents from an aqueous solution thereof, which comprises precipitating from said solution a water-insoluble aluminum salt of said emulsifying agent, dissolving said precipitate in an aliphatic alcohol, admixing with said alcoholic solution an alkaline reagent in an amount sufficient to convert the aluminum present to aluminum hydroxide and precipitate same from said alcoholic solution, and recovering from said alcoholic solution from which all of the aluminum hydroxide has been eliminated an emulsifying agent of said class completely freed of aluminum as a product of the process.

10. In a process for recovering and separating from a synthetic rubber type coagulated copolymer an emulsifying agent which is an alkali metal salt of an alkaryl sulfonic acid, the said emulsifying agent having been employed to establish the aqueous emulsion in which the said coagulated copolymer has been produced from a monomeric material comprising 1,3-butadiene and wherein concomitantly the said coagulated copolymer is recovered free from said emulsifying agent the steps which comprise adding to a latex containing copolymer, which upon coagulation of the latex will result in said synthetic rubber type coagulated copolymer, an aluminum sulfate in an amount between 80 and 250 per cent of the stoichiometric requirement for formation of a water-insoluble aluminum salt of said emulsifying agent, admixing with a resulting coagulated latex an alkali metal hydroxide in an amount sufficient to produce a solution having a pH between 9 and 12, recovering from said solution a resulting emulsifier-free coagulated polymer as a product of the process, acidifying said solution to a pH between 1.5 and 4 with an inorganic acid, whereby an aluminum salt of said sulfonic acid is precipitated, separating said precipitate and dissolving same in methanol, admixing with said methanol solution an alkali metal hydroxide in an amount between 100 and 150 per cent of the amount required stoichiometrically to convert the aluminum present to aluminum hydroxide, removing a resulting aluminum-containing precipitate, and recovering from said methanol solution an alkali metal salt of said sulfonic acid.

11. In a process for recovering and separating from a synthetic rubber type coagulated copolymer an emulsifying agent which is an alkali metal salt of an alkaryl sulfonic acid, the said emulsifying agent having been employed to establish the aqueous emulsion in which the said coagulated copolymer has been produced from a monomeric material comprising 1,3-butadiene and wherein concomitantly the said coagulated copolymer is recovered free from said emulsifying agent the steps which comprise adding to a latex containing copolymer, which upon coagulation of the latex will result in said synthetic rubber type coagulated copolymer, an aluminum sulfate in an amount between 80 and 250 per cent of the stoichiometric requirement for formation of a water-insoluble aluminum salt of said emulsifying agent, admixing with a resulting coagulated latex an alkali metal hydroxide in an amount sufficient to produce a solution having a pH between 9 and 12, recovering from said solution a resulting emulsifier-free coagulated polymer as a product of the process, acidifying said solution to a pH between 1.5 and 4 with an inorganic acid, whereby an aluminum salt of said sulfonic acid is precipitated, separating said precipitate and dissolving same in isopropanol, admixing with said isopropanol solution an alkali metal hydroxide in an amount between 100 and 150 per cent of the amount required stoichiometrically to convert the aluminum present to aluminum hydroxide, removing a resulting aluminum-containing precipitate, and recovering from said isopropanol solution an alkali metal salt of said sulfonic acid.

WILLIE W. CROUCH.
LESHER A. MITCHELL.

REFERENCES CITED

The following references are of record in the file of this patent:

UNITED STATES PATENTS

| Number | Name | Date |
|---|---|---|
| 1,495,891 | Divine | May 27, 1924 |
| 2,378,693 | Fryling | June 19, 1945 |
| 2,469,827 | Johnson | May 10, 1949 |

Certificate of Correction

Patent No. 2,604,467

July 22, 1952

WILLIE W. CROUCH ET AL.

It is hereby certified that error appears in the printed specification of the above numbered patent requiring correction as follows:

Column 4, line 2, for "were" read *are*; column 9, line 39, for "octaldecahydrate" read *octadecahydrate*; line 56, for "30 volumes" read *300 volumes*; column 10, line 51, in the table, column 3 thereof, for that portion of the subheading reading "$Al_2(SO_4)_3=$" read $Al_2(SO_4)_3-$; column 11, line 25, for "$CH_2=<$" read $CH_2=C<$;

and that the said Letters Patent should be read as corrected above, so that the same may conform to the record of the case in the Patent Office.

Signed and sealed this 10th day of February, A. D. 1953.

[SEAL]

THOMAS F. MURPHY,
*Assistant Commissioner of Patents.*

Certificate of Correction

Patent No. 2,604,467 — July 22, 1952

WILLIE W. CROUCH ET AL.

It is hereby certified that error appears in the printed specification of the above numbered patent requiring correction as follows:

Column 4, line 2, for "were" read *are*; column 9, line 39, for "octaldecahydrate" read *octadecahydrate*; line 56, for "30 volumes" read *300 volumes*; column 10, line 51, in the table, column 3 thereof, for that portion of the sub-heading reading "$Al_2(SO_4)_3=$" read $Al_2(SO_4)_3—$; column 11, line 25, for "$CH_2=<$" read $CH_2=C<$;

and that the said Letters Patent should be read as corrected above, so that the same may conform to the record of the case in the Patent Office.

Signed and sealed this 10th day of February, A. D. 1953.

[SEAL]

THOMAS F. MURPHY,
*Assistant Commissioner of Patents.*